(12) United States Patent
Raymond

(10) Patent No.: US 7,529,642 B2
(45) Date of Patent: May 5, 2009

(54) METHOD FOR EVALUATING THE QUALITY OF DATA COLLECTION IN A MANUFACTURING ENVIRONMENT

(75) Inventor: Thierry Raymond, Grabels (FR)

(73) Assignee: PDF Solutions S.A., Montpellier Cedex 5 (FR)

(*) Notice: Subject to any disclaimer, the term of this patent is extended or adjusted under 35 U.S.C. 154(b) by 0 days.

(21) Appl. No.: 11/660,396

(22) PCT Filed: Aug. 22, 2005

(86) PCT No.: PCT/IB2005/003002

§ 371 (c)(1),
(2), (4) Date: Feb. 14, 2007

(87) PCT Pub. No.: WO2006/018738

PCT Pub. Date: Feb. 23, 2006

(65) Prior Publication Data

US 2007/0260410 A1 Nov. 8, 2007

Related U.S. Application Data

(60) Provisional application No. 60/603,399, filed on Aug. 20, 2004.

(51) Int. Cl.
*G06F 11/30* (2006.01)
*G06F 17/40* (2006.01)

(52) U.S. Cl. .................. 702/182; 702/185; 702/187; 702/188; 714/25

(58) Field of Classification Search ......... 702/179–190, 702/75–79, 191–195; 709/203, 226; 700/9, 700/10, 28–32; 714/25
See application file for complete search history.

(56) References Cited

U.S. PATENT DOCUMENTS

| 6,411,987 | B1 | 6/2002 | Steger et al. | |
|---|---|---|---|---|
| 2002/0188888 | A1* | 12/2002 | Rivoir | 714/25 |
| 2004/0039536 | A1* | 2/2004 | Garnett | 702/58 |

FOREIGN PATENT DOCUMENTS

EP 1 441 517 A1 7/2004

* cited by examiner

*Primary Examiner*—Eliseo Ramos Feliciano
*Assistant Examiner*—Phuong Huynh
(74) *Attorney, Agent, or Firm*—Okamoto & Benedicto LLP

(57) ABSTRACT

A method for evaluating the quality of data collection in a manufacturing environment is provided. Said data are intended to be analyzed by a process control system. The method comprising the following steps (A) collecting raw data according to a Data Collection plan specifying, and for each data item, a sampling time reference indicating at which time interval it is expected, and associating to each collected data item a timestamp indicating its actual collection time, (B) for at least a part of the raw data included inside a predetermined window, determining a Data Collection Quality Value (DCQV) by: (a) reading the timestamps; (b) computing at least one quality indicator value from the relationship between each timestamp and the corresponding time reference, wherein a shift represents a malfunction of the equipment or of the data collection system; (c) after steps (b) and (c) have been performed for all data items, computing a single data collection quality value (DCQV) indicator for said time window. Application to data qualification for analysis and equipment qualification e.g. in a semiconductor fab.

9 Claims, 11 Drawing Sheets

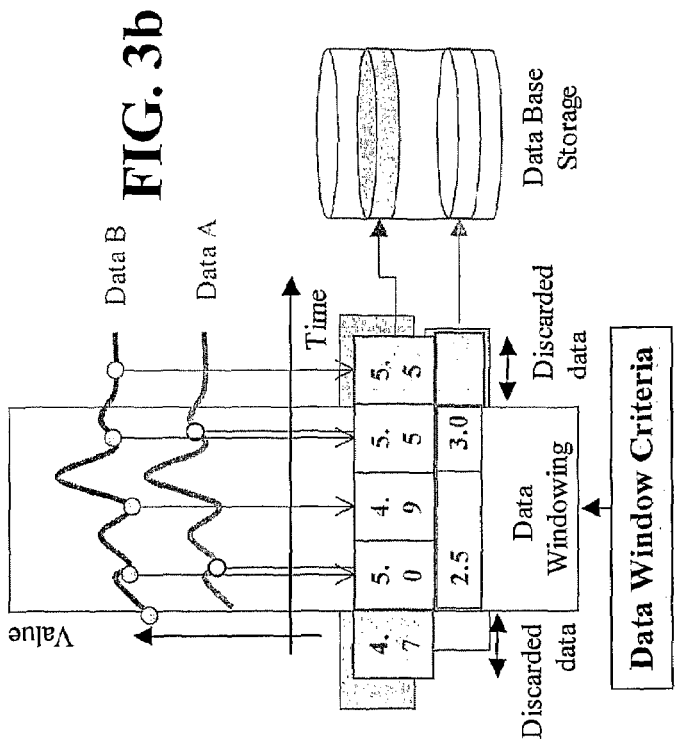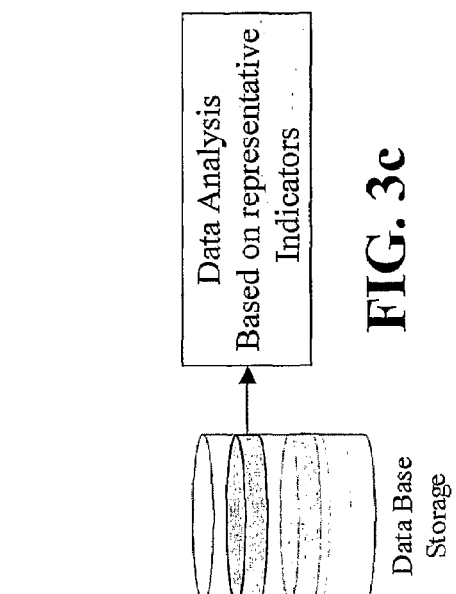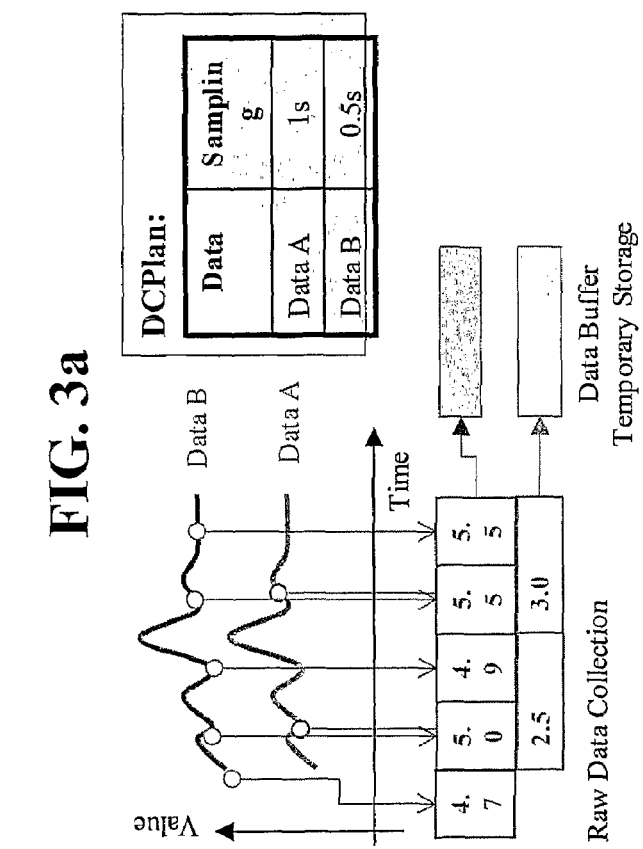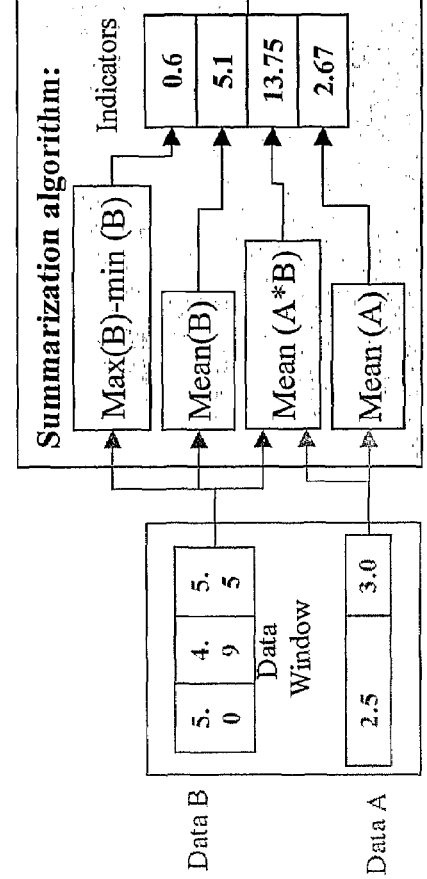
FIG. 3a
FIG. 3b
FIG. 3c

METHOD FOR EVALUATING THE QUALITY OF DATA COLLECTION IN A MANUFACTURING ENVIRONMENT

CROSS-REFERENCE TO RELATED APPLICATION

The present invention claims the benefit of U.S. Provisional Patent Application No. 60/603,399, filed Aug. 20, 2004, entitled "A Method for Evaluating the Quality of Data Collection in a Manufacturing Environment", by inventor Thierry Raymond, the disclosure of which is hereby incorporated by reference in its entirety.

The present invention generally relates to a method and system for quantifying and control the quality of a supply chain system collecting data from a manufacturing equipment such as a semiconductor fab, a flat panel display fab of other electronics, optics or optoelectronics manufacturing environments.

BACKGROUND OF THE INVENTION

In such environments, data collection operations are typically executed by a central processing system and apply to data usually coming from multiple equipments: Process Equipments, Metrology Equipments, External Additional Sensors, Other application Automation/Manufacturing Execution System (MES), Databases, etc.

Due to a continuous technical progress in the field of semiconductors, these equipments are indeed more and more many and/or more and more complex due to the miniaturization of the manufactured components, and require a high degree of reliability for meeting high semiconductor products standards.

Thus it is a need of a control system for monitoring and analyzing the whole data coming from all the equipments to enhance the production quality control. More specifically, in order to avoid such a control system working on bad quality data, and consequently raising false alarms and the like, there is a need for a control of the quality of the data supply chain.

More specifically, when a system for production quality control uses pre-treatments such as a "data windowing" scheme to select only the useful data corresponding to what is requested for further data analysis and therefore optimize the necessary amount of collected data to maintain in the data base, and summarization algorithms to translate the raw data into indicators, corresponding to the desired physical and statistical process information needed for production quality control, these pre-treatments are liable to provide false results due to missing or non-synchronized raw data. In other words, the underlying algorithms are not capable of detecting the origin of the presence of these bad raw data quality.

Therefore, false alarms or the like problems can be generated while the problem arises not from the data values but from the data collection chain.

SUMMARY OF THE INVENTION

The present invention aims at guaranteeing a good reproducibility and quality level of the collected data, and therefore to ensure an accurate and reproducible data analysis, and at avoiding an inappropriate behavior of the quality control system when the quality of data collection is not sufficient. The present invention also aims at classifying or qualifying the pieces of equipment of a fab according to their data collection capacity.

To that effect, the present invention provides according to a first aspect a method for evaluating the quality of data in a manufacturing environment, said data being intended to be analyzed by a process control system, the method comprising the following steps:

(A) collecting raw data according to a predefined Data Collection plan (DCPlan) specifying which data must be collected, and for each data item, a sampling time reference indicating at which time interval it is expected, and associating to each collected data item a timestamp indicating the time at which it is actually collected, (B) for at least a part of the raw data included inside a predetermined window, determining a Data Collection Quality Value (DCQV) by:

(a) reading the timestamps of the raw data items successively for each of them;

(b) computing at least one quality indicator value from the relationship between each timestamp and the corresponding time reference, wherein a shift between timestamps and time reference is representative of a malfunction of the equipment or of the data collection system;

(c) after steps (b) and (c) have been performed for all data items, computing a single data collection quality value (DCQV) indicator for said time window.

Certain preferred, but non limiting aspects of this method are as follows:

a plurality of quality indicator values are computed and normalized, and said single DCQV indicator is set to the minimum of said quality indicator values.

said quality indicator values include a ratio between a number of actually collected data samples and a number of expected data samples in a given time window.

said quality indicator values include a time difference between a sampling period separating two successive requests for data samples and the actual interval separating the times at which these samples are effectively collected.

said quality indicator values include a sum of said time differences over a given time window.

said quality indicator values include an error indicator.

said error indicator can only take negative values while other indicator values are positive or null, where by the existence of an error can be detected from the single DCQV value.

According to a second aspect, the present invention provides a method for controlling a process in a manufacturing environment, wherein raw data from equipment, metrology, etc. are collected and analyzed, comprising the following steps:

evaluating data collection quality as defined above for a plurality of windows of data collection, performing data analysis for the data of a given window only if the quality of collected data is higher than a predetermined level.

According to a third aspect, the present invention provides a method for classifying pieces of equipment in a manufacturing environment such as a semiconductor fab, wherein raw data from pieces equipment, metrology, etc. are collected and analyzed, comprising the following steps:

evaluating data collection quality as defined above for a plurality of windows of data collection and for a plurality of pieces of equipment, identifying a piece of equipment as acceptable in the environment only if the quality of collected data for this piece of equipment is higher than a predetermined level.

BRIEF DESCRIPTION OF THE DRAWINGS

The present invention will be more clearly understood from the following detailed description of a preferred but non-limiting embodiment thereof, made with reference to the appended drawings, in which:

FIGS. 3a to 3c illustrate the three main steps performed by the FDC environment of FIG. 2.

DETAILED DESCRIPTION OF A PREFERRED EMBODIMENT

Figure 1:
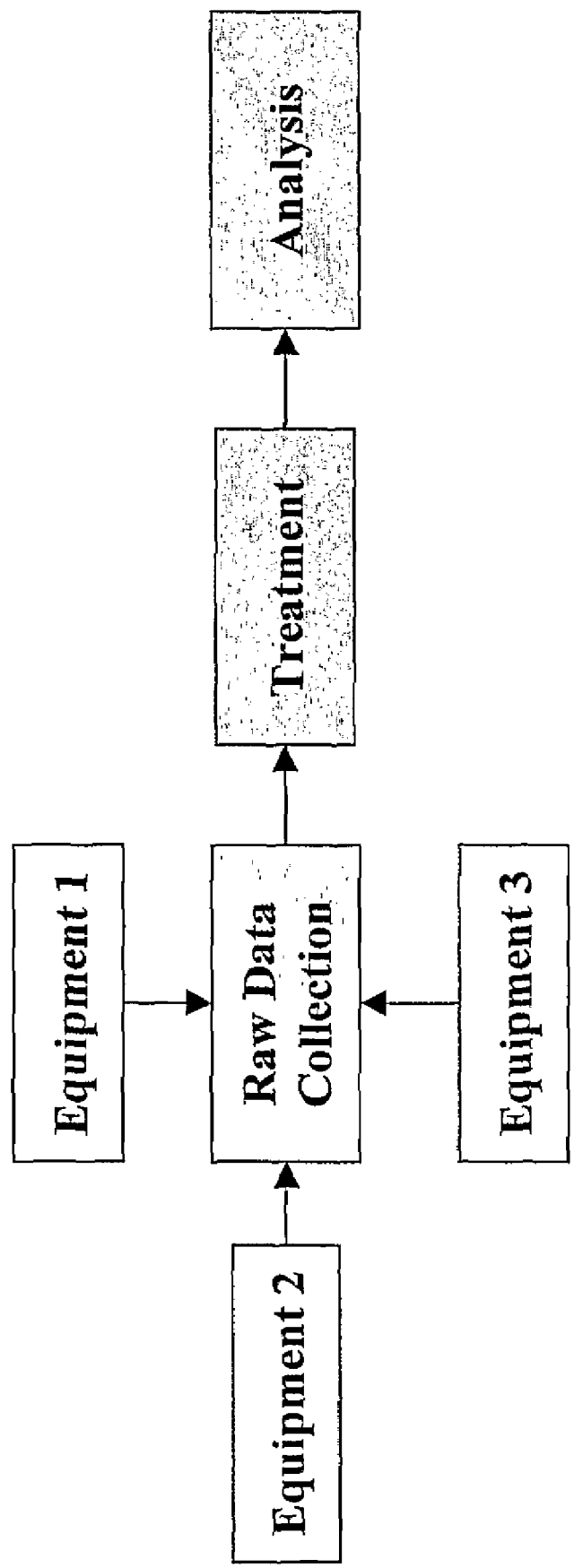
FIG. 1 is a block diagram of the main components of known process control system for a semiconductor fab.

Now referring to the drawings, the known fab control environment to which the present invention can be applied will first be described.

The block diagram of FIG. 1 diagrammatically shows the main steps implemented by conventional Advanced Process Control (APC) or Advanced Equipment Control (AEC) systems, wherein the processing system collects firstly the raw data coming from the various equipments, then pre-treats them in order to summarize the raw data into appropriate indicators reflecting the process health, and finally analyzes the pre-treated data for giving a result (as for example a diagnostic on the quality of the manufactured semiconductor products).

Figure 2:
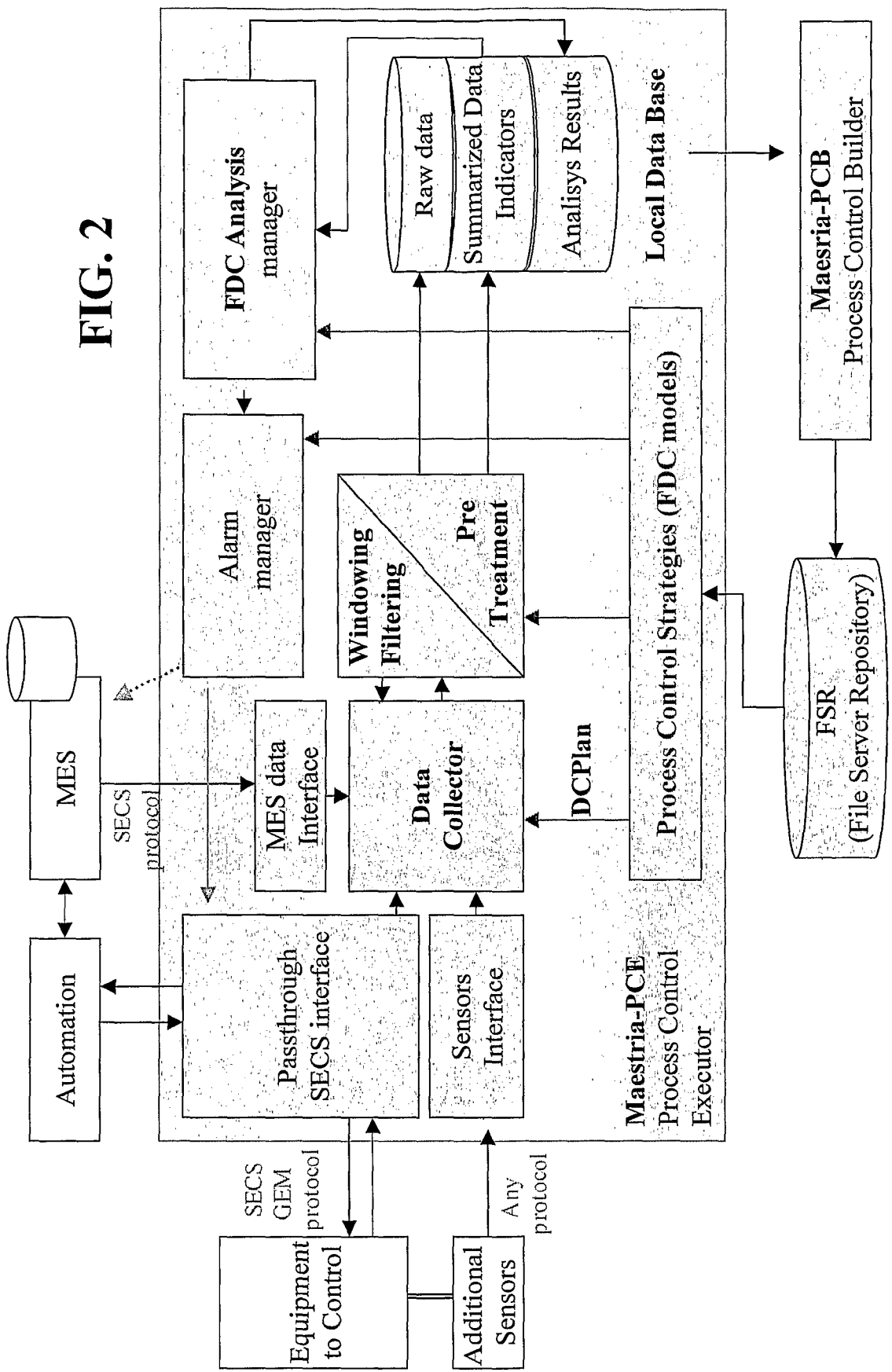
FIG. 2 is a more detailed block diagram of a known fault detection and classification (FDC) environment in which the present invention may be implemented.

FIG. 2 of the drawings illustrates a known Fault Detection and Classification (FDC) system architecture, which is currently commercialized by the assignee of the present application under the Maestria range of software tools, that can divided into 5 main modules:

1) Data Sources: data are collected from two types of semiconductor equipment:

Semiconductor Process or Metrology equipment, using a standardized protocol such as the SEMI's "Semiconductor Equipment Communication Standards/Generic Equipment Model" (SECS/GEM)", Additional Sensors, also using SECS protocol or any other proprietary communication protocol or standard ones (ModBus, ModBus TCP, XML/SOAP, etc.)

2) A Data Collection module ("Data Collector" in FIG. 2) and its interaction with fab automation: different interfaces capable of handling Data Collection exchange messages with different sources.

This includes logistic data collection coming from fab automation exchanges, giving information about which product and material is processed, which process recipe is used and catching changing events about which sub-recipe treatment step is currently running.

Also, in case of equipment do not having specific data collection port available, a pass-through mechanism is used to share the single available Equipment connection between Automation and Data Collection message exchanges.

3) a data filtering, pretreatment and storage module ("Windowing Filtering/Pre-Treatment" and "Local Data Base" in FIG. 2): this module is designed for extracting only the useful part of data from the whole data collection set. Then, it builds summarized indicators using temporal raw data parts. It also manages the raw data and indicator storage into the FDC data base.

4) a data analysis and alarm management module ("FDC Analysis manager" and "Alarm manager" in FIG. 2): this module performs data analysis based on previously computed indicators in order to detect and classify any equipment or process drift. It raises an alarm in case of detecting any out-of-control value. It stores the analysis result context into a so-called FDC Data Base.

5) a process control strategy and management module ("Process Control Strategies" in FIG. 2), which manages all Fault Detection and Classification Control Strategy files, containing the entire definition of the FDC process (Data Collection Plan Definition, Window definition, Indicator computation definition, Analysis Model to be used, Out-of-Control limits and associated alarm action to be raised).

The three main steps of the FDC system which are interrelated with the process and system of the present invention (as will be described in the following) are illustrated in FIGS. 3a-3c of the drawings. They are performed in the "Windowing Filtering/Pre-Treatment" module of FIG. 2.

The first step, as depicted in FIG. 3a, is a raw temporal data collection according to a Data Collection Plan (DCPlan in FIG. 2), defining which data values have to be collected (i.e. Processing Chamber Temperature, He Gas Flow, . . . ) and, for each data value, the requested individual sampling period (i.e. 0.5 second, 1 second, etc.).

The Data Collection Plan is a sub-part of the FDC Process Control Strategy definition.

The second step as shown in FIG. 3b consists in filtering the data collected in the above collection step by selecting a subset of the collected data. This operation, also called "Data Windowing", is used to select only the useful data corresponding to what is requested for further data analysis application cases. The purpose of this step is to optimize the necessary amount of collected data to maintain in the data base.

The Data Windows can be defined by using and combining various approaches, such as:

synchronizing Data Window with Equipment Automation events, i.e. Process Start or Process Stop;

synchronizing Data Window with Equipment Process steps, i.e. collecting data only during relevant sub-steps of the entire process, defining a time dependent Data Window, for example from 1 second after process start event up to 10 second after process stop event of for a given duration, defining dynamic Data Windows depending on a threshold given by particular value of such or such collected data, e.g. starting Data Window when Data A is higher than 3.5, and stopping Data Window when Data B is lower than 5, using any other more sophisticated rules as defined by the user.

In the FDC environment of FIG. 2, the Data Window criteria are subparts of the FDC Process Control Strategy definition.

It should be noted here that other filter types can be applied at this stage, such as eliminating non coherent data values. In such case, the data is not replaced by any estimated or interpolated value: the data is simply missing and a "hole" is present in the data collection.

The third step, as depicted in FIG. 3c, computes standard or user defined Summarization Algorithms to translate the raw data into indicators, corresponding to what process information is relevant to obtain, from physical and statistical points of view. (i.e. Temporal Mean value, Min value, Max value, Range, RMS value, Average Power=Mean[Ui*Ii] . . . )

These Summarization Algorithms are stored in the FDC Process Control Strategy definition of FIG. 2.

The indicators computed by means of these summarization algorithms are intended to be used as main input data of the FDC Analysis module. They indicate the process equipment health and trigger appropriate alarms in case of out-of-control detection and classification.

As already explained in the introductory part of this description, the above second and third data pretreatment steps are aimed at selecting relevant raw data (windowing filters determining useful part of data to be further analyzed), then to summarize this raw data into indicators that are representative of the process health. However, these algorithm-based pretreatments are liable to provide false results due to missing or non-synchronized raw data. In other words, they are not capable of detecting the origin of the presence of these bad raw data quality.

In order to guarantee a good reproducibility and quality level of the collected data, and therefore to ensure an accurate and reproducible data analysis, the system of the present invention further comprises a Data Collection Quality Value (DCQV) indicator generating module, such DCQV indicated being intended to quantify from a global standpoint the data collection chain behavior.

The DCQV indicator generating module returns a DCQV indicator value preferably comprised between 0 and 1 (0 . . . 100% range) representing the gap between what is ideally expected and what is really obtained in terms of data collection as defined by the Data Collection plan.

It should be noted here that the DCQV indicator preferably can also take negative values to report any Data Collection chain failure or software errors leading to invalidate the corresponding collected data set. In that case, a particular error description is associated to each particular negative value, clearly identifying the root cause of the Data Collection chain failure.

A detailed description of the DCQV generating means is now described.

An individual DCQV indicator is computed for each of a plurality of particular Data Windows, on which summarized data Indicators are computed.

For a given process control strategy, composed of different Data Windows, a global strategy DCQV indicator is computed as the minimum DCQV of each individual Data Window.

Figure 4:
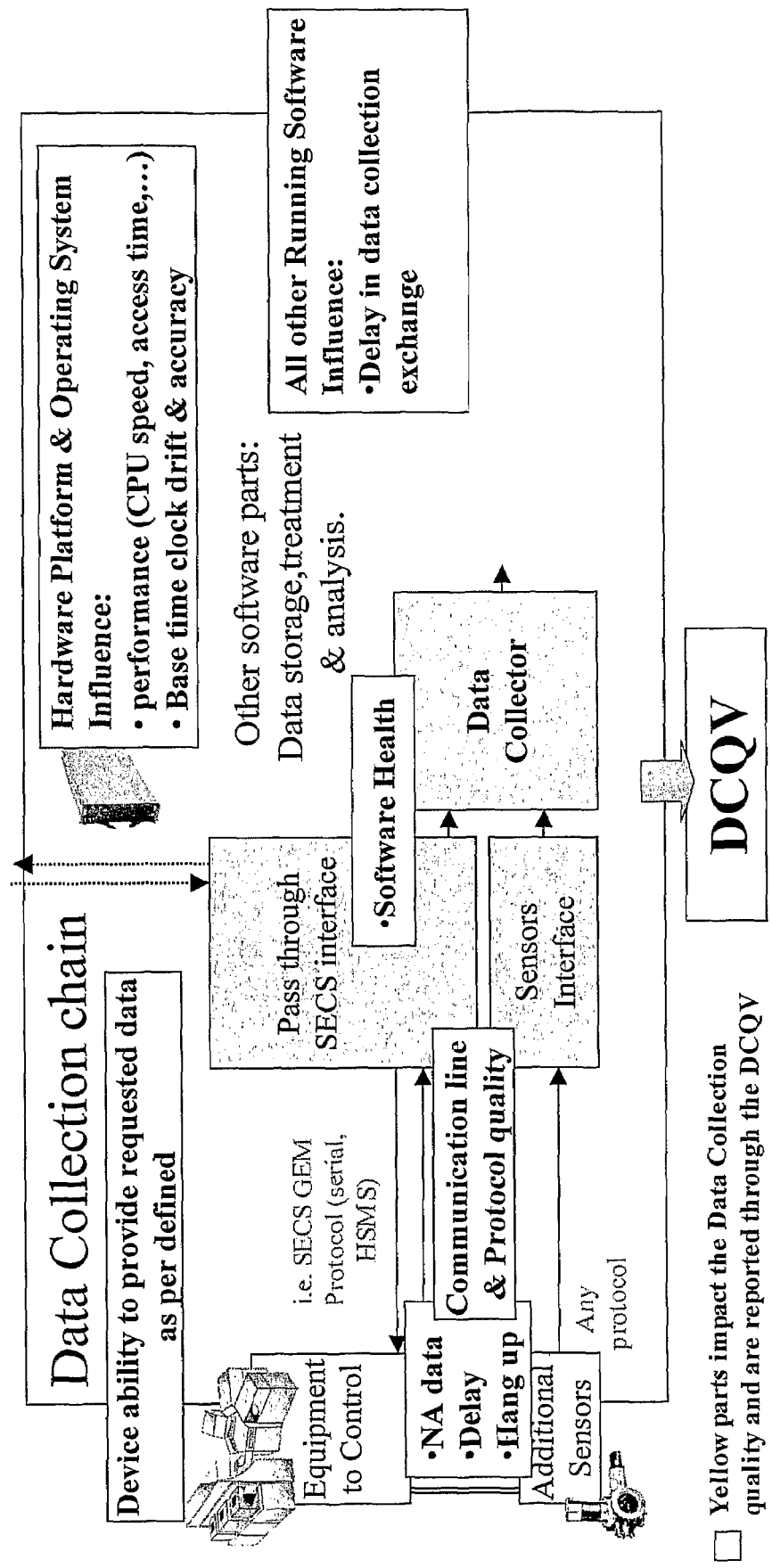
FIG. 4 is a detailed block diagram of the components of the control system which directly or indirectly contribute to the method and system of the present invention.

FIG. 4 depicts which main components are directly or indirectly contributing in the Data Collection chain mechanism, impacting the quality of the Data Collection, and so, are directly and indirectly under the DCQV control.

These main components and their respective influence on the Data Collection quality that are reported through the DCQV indicator are in the present embodiment:

the monitored devices—or Equipments—and their ability to provide the requested data in a timely manner, the communication channel and the communication protocol between the monitored devices—or equipments—and the data collection system, and their ability to provide the requested data in a timely manner, the software modules of the Data Collection system and their ability to treat the data collection messages in a timely manner. By "treat", it is meant here functions such as:

managing the Data Collection Start/Pause/Stop triggers events, getting Data Collection plan & Build data collection request messages and send it to the devices, receiving the data collection reply messages, parsing the message to extract and store the data values, in case of using a so-called "Pass-through" module (known as allowing to share the single Equipment communication port with the automation system), managing the priority given to the automation messages exchange, compute the DCQV indicator;

all the other software modules or parts running on the same hardware platform and sharing the same hardware resources (CPU, RAM, HDD, . . . ) and their indirect influence slowing down the Data Collection exchanges, the hardware platform, its components and its associated Operating system influencing the software performances and their ability to provide a base time clock with small drift and high accuracy.

It should be noted here that the DCQV is normally not intended to cover other data quality issues such as the actual data quality as provided by the fab Equipment. This would require an additional measurement system to compare collected data & timestamp with real data value and timestamp provided by the equipment.

The DCQV generating means is practically embodied by a set of specific software modules integrated into the Data Collection part of the FDC software system.

Once computed, the DCQV indicator is used by the FDC Analysis Module to decide whether the data analysis can be performed or not, with a sufficient confidence level in the analysis result.

This is done by comparing the generated DCQV indicator value with a threshold value called Data Collection Quality Level (DCQL) setup by the user.

Figure 5:
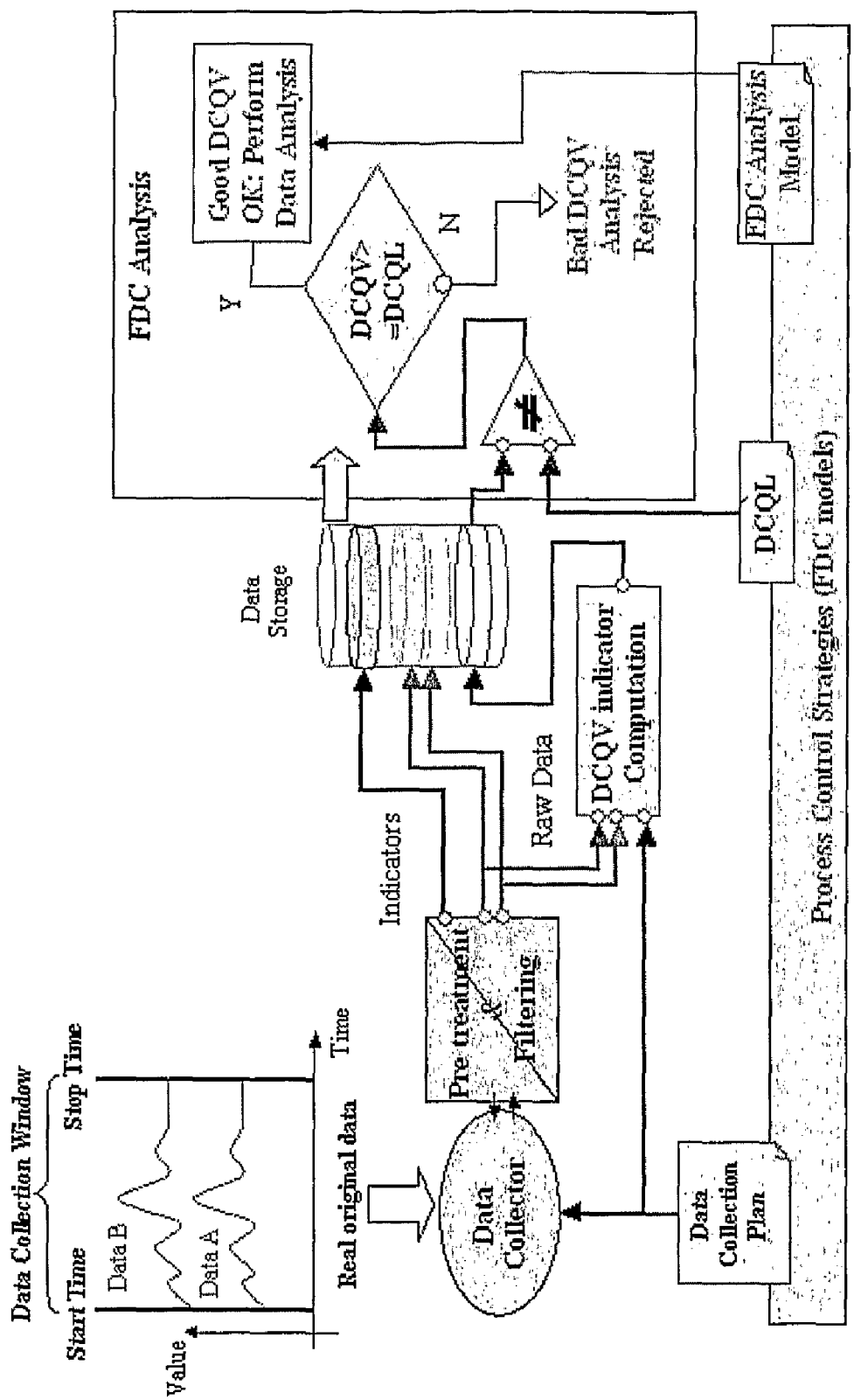
FIG. 5 is a flow chart, sub part of the FDC environment of FIG. 2, positioning the data collection quality indicator computation and its threshold usage provided by the invention.

FIG. 5 illustrates the interconnection with the DCQV computation means and its associated means for comparison with threshold DCQL with the FDC environment, which is now described in greater detail with reference to FIGS. 6a and 6b.

Figure 6A:
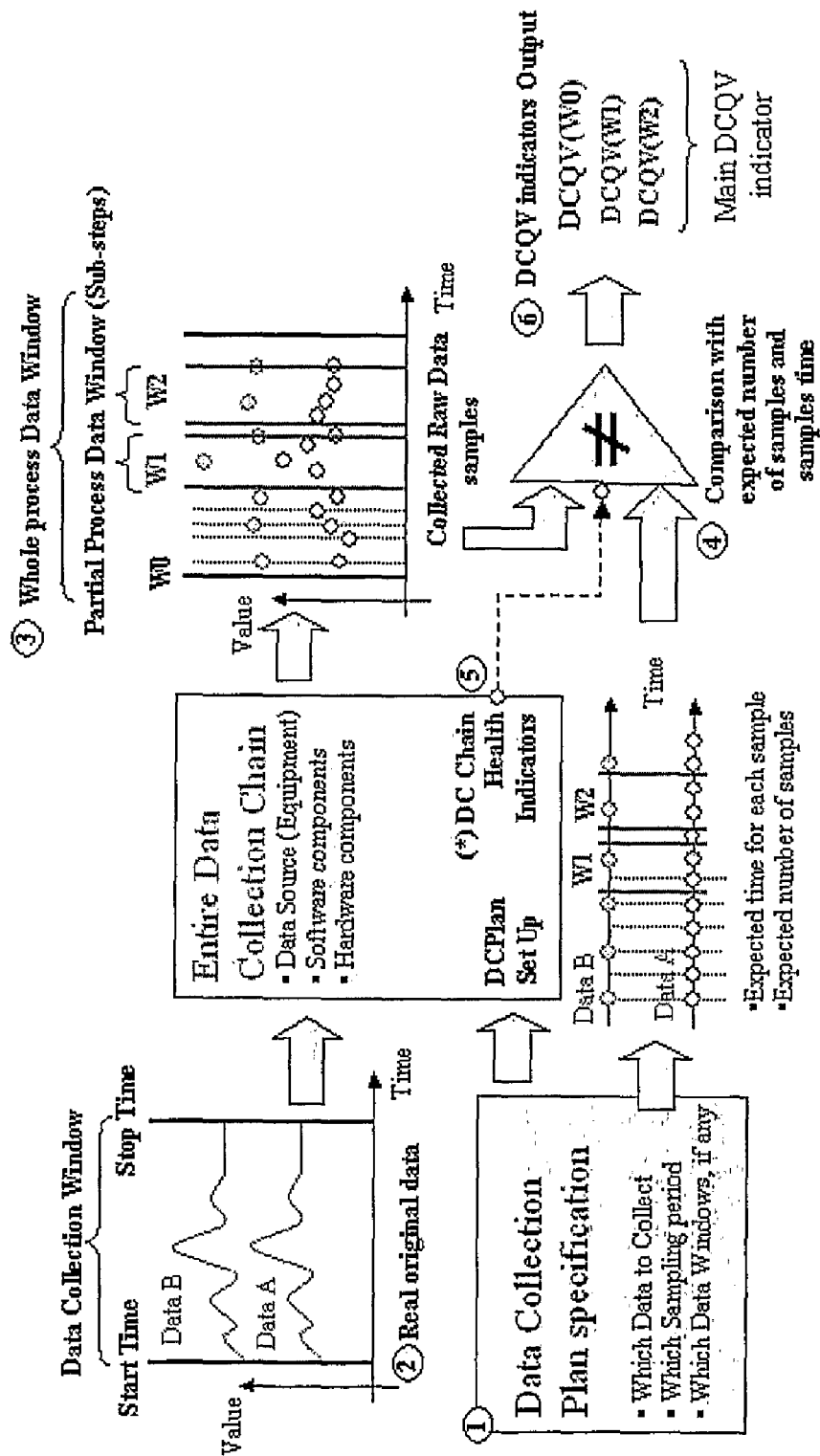
FIGS. 6a and 6b are more detailed flow charts of the DCQV processing system globally depicted in FIG. 5, FIGS. 7a, 7b and 8 show examples of data collection transactions between processing system and equipments and illustrate typical timing issues reflected in one embodiment of the invention.

FIG. 6a shows the various steps involved in the DCQV mechanism associated to the data collection system:

The Data Collection plan specification is the reference input for the data collector: it defines how to perform the Data Collection, defining which data has to be collected, at which sampling rate and which particular data Windows will be useful for further data analysis, if any.

The real original Equipment data source that has to be collected, acquired through the Data Collection chain between a start and a stop time. The acquisition is resulting into successive samples of data, normally consecutively separated by one sampling period.

The Data Windowing allows taking in consideration whole or interesting part of the collected data samples, depending on the data analysis to perform.

According to the Data Windows, the DCQV indicator is computed for each one, making the comparison between what is specified by the Data Collection plan and what is really collected. Taking into account what is expected in terms of number of sample in the given window, and in terms of timestamp of each sample.

In addition, the DCQV is not computed if there any unexpected behavior of the Data collection system. In that case the DCQV takes a negative error value (see the convention described below) and any data analysis cannot be performed on the Data.

If there is no error of the Data Collection system, one DCQV is issued for each defined data window, and a main DCQV is given as a global scoring for the whole Data Collection plan execution.

Several data analyses can be associated to a unique data collection plan.

Each data analysis can use whole or part (data window) of the collected data.

To avoid a bad DCQV, due to a particular data window, is impacting all the data analysis, a particular DCQV indicator is computed for each analysis. It combines the individual DCQV of each data window involved in the analysis.

Figure 6B:
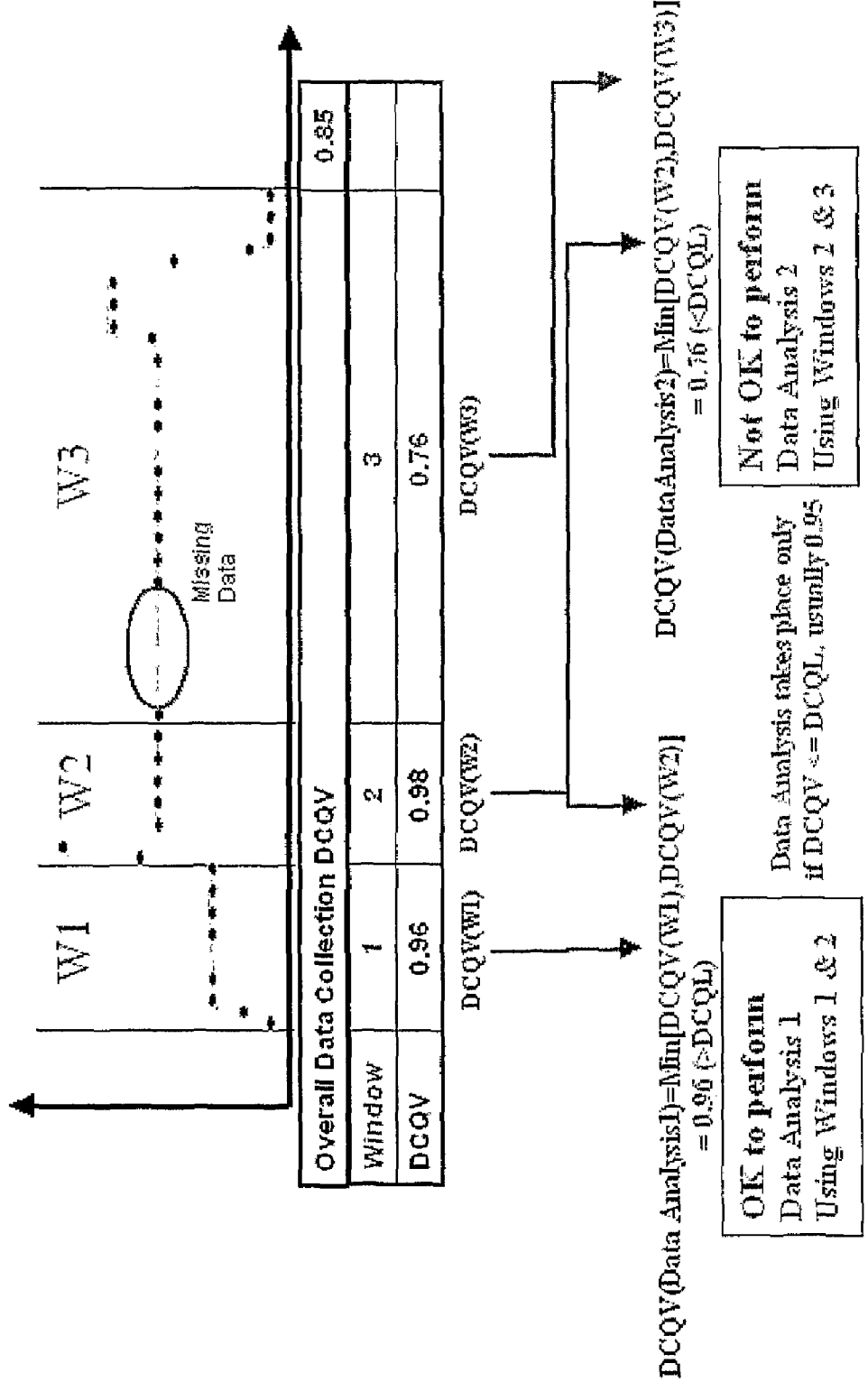

FIG. 6b shows an example of the usage of the Data Window DCQVs allowing to enable a data analysis on a particular window, while disabling the data analysis for the other one, where the data collection is not good enough.

The data collection transaction mechanisms between the processing system and any equipment able to provide data will now be described, together with illustration of typical timing issues.

First of all, there are two main Data Collection mechanisms:

Data Collection by Polling: The data are explicitly requested each time they have to be collected. The typical transactional mechanism, repeated for each sampling time, is to send a Query message to the equipment containing the list of data to be collected, and then wait the Reply message from the equipment containing the data values. The main advantage of this method is that one could change the data list at each transaction, and so, dynamically change the sampling time (Dynamic sampling period).

Trace Data Collection: The data are regularly sent by the Equipment, at each sampling time through an Event message, without any additional Query than the initial one, specifying the list of the data to be collected, and the requested sampling period. In that case it will be more difficult to synchronize the changes of the data list and to work with a dynamic sampling period.

In both cases, the Reply or the Event messages will then be parsed to extract the data values that are stored into a file or a data base.

It will be noted first that the system communicates with at least a part of the equipment according to a given protocol. This protocol can be dedicated a semiconductor fab and comply with any of the standards in the field such as the SECS (Semiconductor Equipment Communication Standard).

Figure 7A:
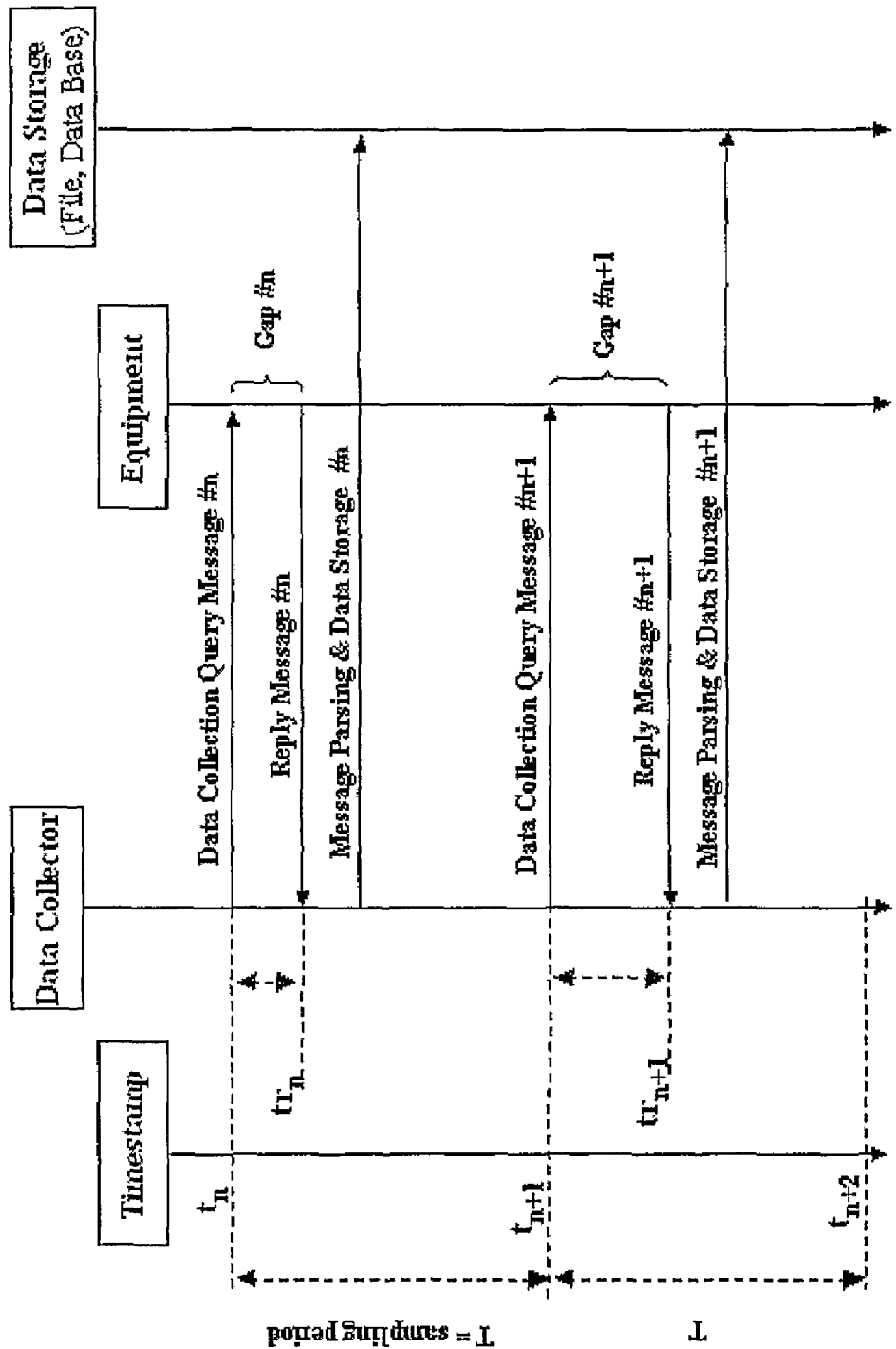

Polling Data Collection is illustrated in FIG. 7a which shows a typical scenario of a successful polling data collection. The Equipment can be a Semiconductor Equipment, a Sensor or any other device able to provide data on request using any data exchange protocol. For example for semiconductor equipment it will be the SECS protocol, using S1F3/S1F4 polling transactions, and for other devices it could be standard protocols, such as Modbus one, or any other proprietary protocol.

As shown in FIG. 7a, the processing system sends at time "$t_n$" a request to the equipment for collecting a raw data element. The equipment replies to this request at the time $tr_n$. The raw data element associated to said reply is then stored in database or in a buffer memory. The time $t_n$ is also stored with the raw data. Then the processing system sends similarly at time $t_{n+1}$ another request to the equipment, and the reply is received at time $tr_{n+1}$.

Figure 7B:
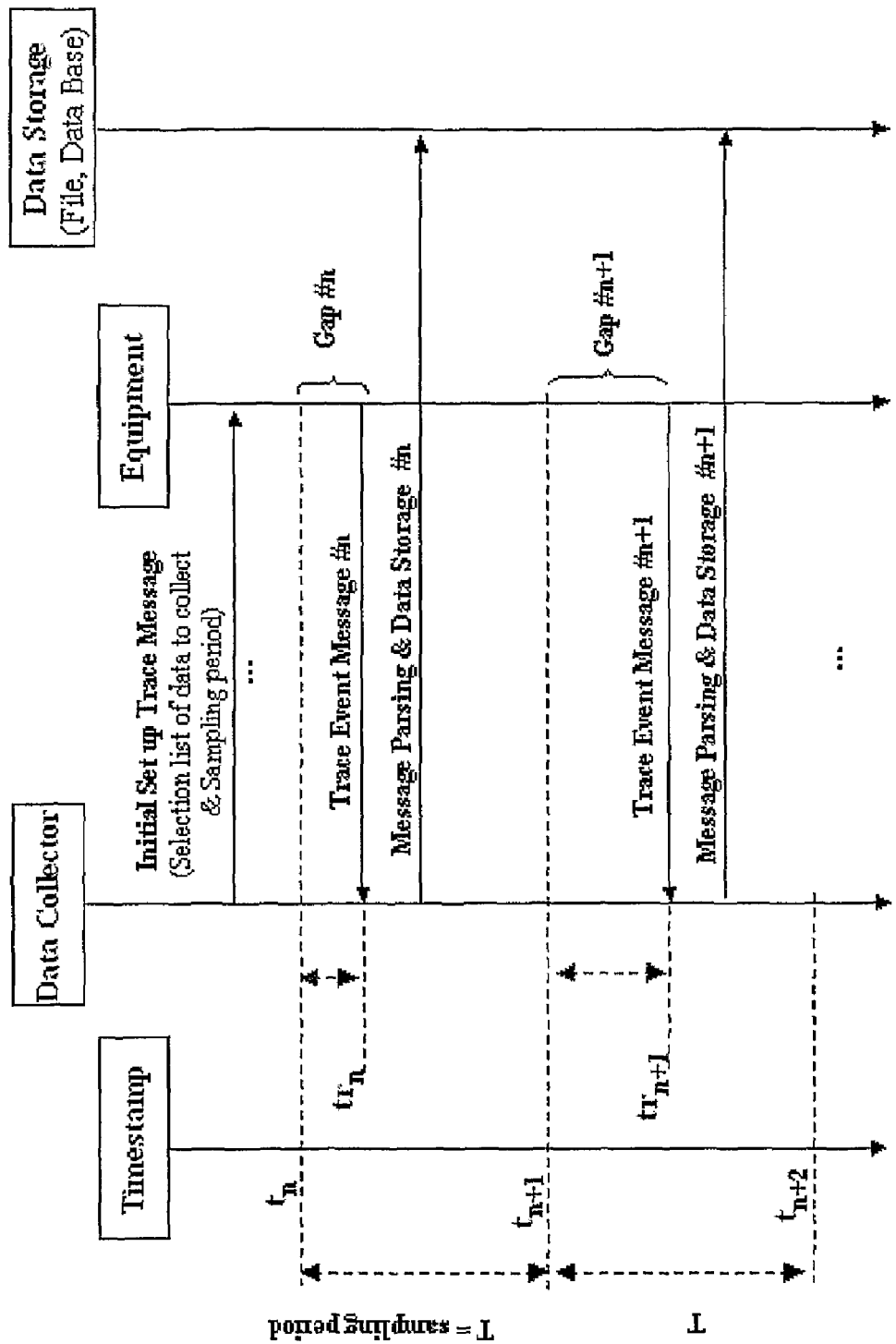

FIG. 7b corresponds to the same case as FIG. 7a, but transposed to the Trace Data Collection case. In that case, instead of requesting the data at regular sampling period of time, a single "Set up Trace" message is initially sent at the beginning of the data collection. This message contains the list of the data to be collected and the requested sampling period, and it asks the Equipment to send regular event messages containing the data values.

It is to be noted here that, in order to stop the data collection an "unsetup" message has to be sent at the end of the cycle.

This Trace mechanism is very similar to the Polling one if one considers a regular interval of time—based on the sampling period T—as a reference time to receive the successive event messages.

As a consequence, it is treated in the same way than the polling mechanism to measure Gaps and Holes and finally issue the DCQV indicator computation.

FIGS. 7a and 7b illustrate successful data collection transactions regularly exchanged, where each request "n" is separated from the next "n+1" one by the sampling period "T". It means the Request/Reply cycle must be completed within the sampling time in order not to have a "hole" in the data collection.

In addition, another parameter influencing the data collection quality is whether there is a regular timestamp for each data sample. This is called "Jitter effect" (a Jitter is generally, any distortion caused by poor synchronization) and it appears when the time between the request message and the reply message (called "Gap") is subject to variation from one transaction to another one. In the depicted case the Gap values ($Gap_n = tr_n - t_n$ and $Gap_{n+1} = tr_{n+1} - t_{n+1}$) are different, but their values are lower than the sampling period T, and so they are normally treated. Otherwise, there will lead to a data collection hole.

It should be noted here that when there is a Jitter effect, the DCQV indicator will be slightly degraded (cf. infra components 2 & 3 of the DCQV computation).

Figure 8:
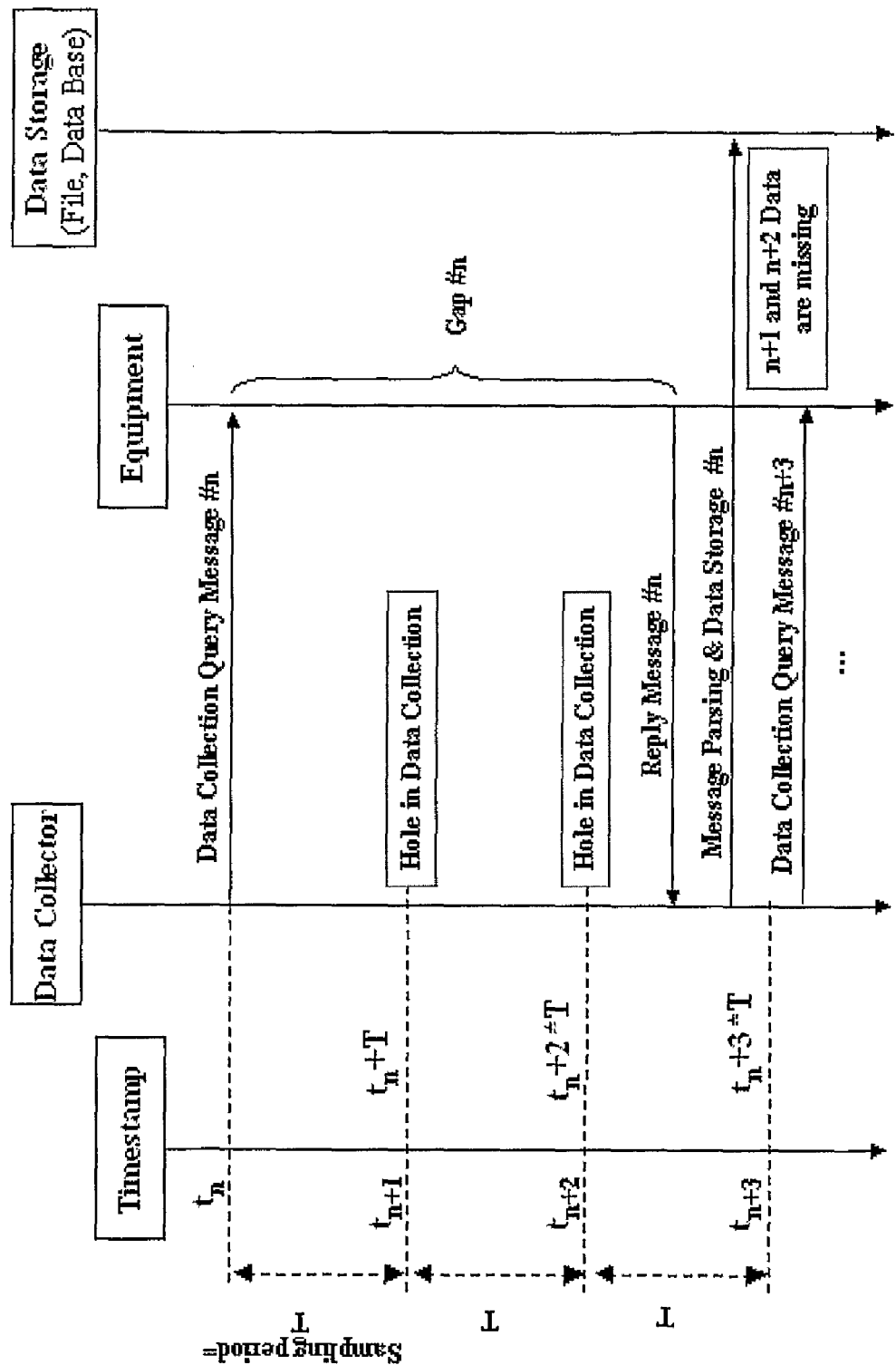

FIG. 8 of the drawings depicts a scenario where the equipment replies too late, and shows how to manage latency in collecting data, and how the DCQV is reported in such case. More particularly, when the Gap value is higher than the sampling period, a sample is received too late, and one or several data collection cycles will be missed creating a hole in data collection:

The real data value is kept and added into the data storage, instead of putting a Not Available (NA) value indicating a missing value.

The intermediate missed samples are not written into the data storage as NA values: there will be a hole into the collect and DCQV will only be affected by this hole, and not by explicit missing data values.

It will be understood that when there is a hole in data collection, the DCQV indicator will be degraded (cf. infra main component 1 of the DCQV computation).

Details of the DCQV computation and the types of components involved will now be described.

First of all, the DCQV is a "scoring" indicator expressed as a number between 0 and 1 (or as a percentage 0% . . . 100%), and it intended to reflect the collected data set integrity.

Associated with the DCQL, which is an acceptable threshold value beyond the collected data is considered as good and reliable enough, it guarantees that the data can be used to perform FDC analysis in robust and repeatable way.

The standard usage of the DCQV indicator is to allow working with an acceptable amount of missing data for the FDC analysis process. It could be better to do not perform 100% of the FDC analysis when data collection set is not good enough, rather than take the risk to artificially introduce false alarms by attempting to re-build or "estimate" the missing values using any kind of algorithm such as linear interpolation, predictive or similarity computation. This assumption is valid as long as the number of rejected analysis is low compared to the total number of process control analysis performed. If it is not the case, a corrective action has to be undertaken to enhance the data collection chain.

With the DCQV indicator, the end user will get a clear visibility about his Data Collection Quality, and can monitor it in order to know if its equipment is still under FDC analysis control.

The DCQV indicator is also used to characterize the Data Collection interface performance of such or such Equipment, and use it as acceptance criteria.

The DCQV indicator is composed of several computation components or indicators, four in the present embodiment. Each indicator reflects a particular quality measure of the Data collection Chain, and the final DCQV scoring is selected as the worst (minimum) value among them.

The role of each indicator is explained below.

Indicator 1

This is the main indicator monitors the holes in data collection. It controls the amount of collected data compared to the requested amount, and it is expressed as the percentage of the actual amount of collected data compared to the expected amount of data in a given time window. It is indirectly impacted by the global response time of the data collection chain.

Indicator 2

This indicator monitors the individual delay of the data sample reply. Reference should be made to the section describing the data collection transaction mechanism for more details. It is expressed as a percentage representing the impact of the largest data collection Gap in a given time window.

Indicator 3

This indicator monitors the cumulated data sample reply delays (i.e. the above-mentioned "jitter" effect). Reference should be made to the section describing the data collection transaction mechanism for more details. It is expressed as a percentage representing the impact of cumulated data collection Gaps in a given time window.

Indicator 4

This indicator dynamically monitors the Data Collector System Health (software & Hardware). It is expressed as a negative value reporting an error case. Each value represents a particular error case for a clear understanding of the error basic cause. Reference should be made here to the negative error code values convention for more details. For example, it could report a data collection buffer overflow (error code is "−24") or the unexpected change or drift of the system Clock, impacting the samples' Timestamp coherency. (error code is "−25")

Implementation details of the above indicators will now be described.

Indicator 1: Detecting Holes in Data Collection

This indicator is the simplest and the most efficient: from a time interval (Data Window) and the sampling period as defined by the reference Data Collection plan, it is easy to determined the number of data samples that should ideally be collected. Indicator 1 merely is the ratio between the number of samples actually collected in the Data Window and the expected number of samples.

Indicator 1 is preferably expressed in a percentage according to the following formula:

$$\frac{NumberOfDataCollected \times SamplingPeriod}{(WindowStopTime - WindowStartTime)}$$

Indicator 2: Impact of Largest Collection Gap in the Window

The computation of this DCQV component involves the difference between the timestamp $tr_{n+1}$ and the time reference $t_s$ when the zero-time for both times is given by the timestamp $tr_n$ of the previous raw data received by the processing system.

In other words, the computation of the indicator comprises computing the difference $(tr_{n+1} - tr_n)$ and $(t_s - tr_n)$, i.e. the time difference between the duration separating two successive replies and the sampling period.

The indicator value computation further includes computing the maximum among these differences, over the width of the time window.

The formula used to compute this indicator is:

$$1 - \left( \frac{LargestCollectionGap - SamplingPeriod}{(WindowStopTime - WindowStartTime)} \right)$$

Where:

"LargestCollectionGap" is the largest time between 2 consecutive reply messages in the data collection communication transactions.

Indicator 3: Impact of Cumulated Collection Gaps in the Window

With the same data acquisition scheme as for Component 2, the computation of the DCQV indicator comprises computing the difference between the timestamp $tr_n$ and the time reference $t_{n+1}$ when the zero-time for both times is given by time $t_n$. Negative values are not taken into account for this computation.

In other words, the indicator computation comprises computing the difference $(tr_n - t_n)$ and $(t_s - t_n)$, i.e. the difference of time between the duration separating the request to the reply of a transaction, and the sampling period.

The indicator computation further includes computing the sum of said differences calculated for all the raw data elements in the determined window that having a result greater than or equal to zero, over the width of the time window.

This sum of differences can then be expressed as following:

$$ConsolidatedCollectionGaps = \sum_{WindowTime} \text{Max}[0, (ReplyDuration - SamplingPeriod)]$$

Where

"ConsolidatedCollectionGaps" is the duration of the whole translations (between a request and a reply) inside the time window, and "ReplyDuration" is the reply time in the communications transaction (i.e. $tr_n-t_n$)

The formula used to compute Component 3 is:

$$1 - \left( \frac{ConsolidatedCollectionGaps}{(WindowStopTime - WindowStartTime)} \right)$$

It should be noted here that, when the Gap value is higher than the sampling period, this means that a sample is received too late, and one or several data collection cycles will be missed, creating a hole in data collection. In such case:

The real data value is kept and added into the data storage, instead of putting a Not Available (NA) value, indicating a missing value.

The intermediate missed samples are not written into the data storage as NA values: we will have a hole into the collect and DCQV will only be affected by this hole, and not by explicit missing data values.

It should further be noted that when there is a Hole in data collection the DCQV indicator will be degraded (see the main indicator 1 of the DCQV computation).

Indicator 4: Data Collection System Health

According to a further possibility of this invention, the DCQV can take negative value in order to report and identify Error Cases.

First of all, taking into account the sole components 1 to 3, the DCQV will have a null value if there is any error detected impacting the data collection process or the DCQV computation. But, in order to inform the user of a critical error as well as the basic error cause, and to be able to display an appropriate error message identifying the cause, the DCQV can be given a negative value.

For example, some events coming from the equipment implies that the data analysis is skipped. This is the case of a manual "Abort Process Event". In that case, the Data Collection stops upon "Abort Process Event" reception. In such situation, the system can set DCQV to "−1" by setting the Component 4 value to this value and the Error Description will be: "Data Collection was cancelled by user".

By using negative values for Component 4, it is ensured that the analysis will not be done for on-error contexts in respect of the DCQV<DCQL rule, where DCQL is always >0.

It is understood however that the user has to take care of this convention while using the DCQV indicator values for any report or calculation based on it, for example to compute a new indicator reporting the average DCQV value on a given period of time.

Actually, only positive or null DCQV values can have significant contribution to any indicator based thereon, and so to avoid any calculation error, either the user should not take into account the negative DCQV values, or should consider the value as "0" in any error case.

Error List Table

The table below enumerates the different possible negative values of the DCQV reporting error cases of the Data Collection system (Data Collector) or the error in the DCQV computation.

It should be noted that this table is given as an example, and some error code can be specifically adapted to a given Data Collector Software Mechanism. In this case it is adapted to the Maestria Process Control system commercialized by the Assignee of the present application:

| DCQV | Description |
| --- | --- |
| −1 | Data Collection was Cancelled by user |
| −2 | A Timeout (named "KillerTimer") has occurred during a Data Collection polling request. |
| −3 | ControlExecutor killer timer event triggered in a data collection state |
| −4 | ControlExecutor killer timer event triggered in a data collection state (2nd time) |
| −5 | Failed to setup a data collection plan during the Data Collection initialization step |
| −6 | Failed to unsetup data collection plan during the Data Collection finalization step |
| −7 | Failed to enable the data collection mechanism |
| −8 | Failed to disable the data collection mechanism |
| −9 | Data Collection Start Event received too fast |
| −10 | Data Collection Start &Stop Events have been received too fast |
| −11 | Data Collection Stop event received before the Start Event and received too fast |
| −12 | Data Collection Stop event has been received before the Start event |
| −13 | Data Collection Stop event has been received too fast to do a good data collection |
| −14 | Data Collection Error event received |
| −15 | Data Collection Error event has been received before waiting for the Start Event |
| −16 | Data Collection Error Event has been received while waiting for the Start Event |
| −17 | Data Collection Error Event has been received while waiting for the Stop Event |
| −18 | Data Collection Start event and Stop event are almost the same, or an event matches the 2 events conditions |
| −19 | Data Collection Start event and Error Event are almost the same and an event matches the 2 events conditions |

-continued

| DCQV | Description |
|---|---|
| −20 | Stop event and ErrorEvent are almost the same and an event matches the 2 events conditions |
| −21 | Data Collection Start event, Stop event and Error Event are almost the same and an event matches the 3 events conditions |
| −22 | Data Collection Context never completed |
| −23 | Error while the DCQV calculation |
| −24 | Machine Overloaded |
| −25 | Time Drift Occurred (i.e. On the machine where is running the data collection, this is resulting of any Base Time change or automatic Clock adjustment during the data collection.) |
| −999999999 | Unknown error - DCQV is initialized to −999999999. It will Report a new not referenced error case. |
| −999999998 | Undefined error - DCQV value is −999999998 in case of mismatch between DCQV error code and error description. |

The previous components 1 to 4 can be combined in various manners to obtain a single DCQV for each predetermined time window. The DCQV gives then indication of a drift of the implementation of the equipment and/or of the processing system in said predetermined time window.

More particularly, the components 1 to 4 as described above are all designed so that that the lower they are, the greater the equipment drift is.

A DCQV can then be made equal to the lowest indicator value.

$$DCQV_n = \mathrm{Min}(Indicator1, Indicator2, Indicator3, Indicator4)$$

Finally, the unique DCQV score globally associated to a Control strategy involving several windows, each having one particular DCQV score, will be the worst scoring value, according to the formula below:

$$DCQV(\mathrm{Context}) = \min_{\mathrm{all\ indicators}} (DCQV_n)$$

A next step of the process is the analysis of the raw data, it a manner known per se.???? According to the present invention, such analysis is not implemented if DCQV is lower than the threshold level DCQL.

The previous description explained how to compute a <<real time>> DCQV indicator, while the data are collected and stored, according to a reference data collection currently running.

However, in case where the data has been previously collected and stored to a file or a database, the DCQV can also be determined in "off line" manner. This is possible only if the following minimum conditions are fulfilled:

The data are identified by their name, and for each data there is a collection of values, and each collected value is dated with a timestamp in any understandable time format, (e.g. a file containing "Process Step", "Temperature", "Pressure" variables and several lines of respective sampling time and values: "26/04/2005 08:32:25.256", "5", "25.5","0.985")

Providing a reference data collection plan defining:
the data list to be used,
the expected sampling period,
the "Windowing" Conditions, expressed as a Time window (Start Time & Stop Time), and/or as some data selection criteria based on one or several available variables (e.g. only take into account the data when the "Process_Step" variable is equal to 5)

The data collection plan could also be the original one as produced the data collection, if existing.

Under these input conditions, it is possible to apply all the DCQV formulas on each window condition, and finally provides a DCQV indicator on previously collected data.

For example, this technique can be used to compute DCQV indicator prior to a centralized analysis of the collected data set. The reason is that in such case, the data collection system is distinct from the centralized analysis system, and the collected data are previously pushed to a centric database.

In this centralized data flow, it is now possible to do not systematically use the standard Si Automation PCE Data Collector (natively including the DCQV computation), and the different data can comes from various type of Data Collector (i.e. Future EDA capability of the Equipments having their own data collector), only providing final collected data set without any DCQV computation.

Finally, the DCQV indicator generation according to the present invention can be used for evaluating a Data Collection performance of various pieces of equipment.

Figure 9:
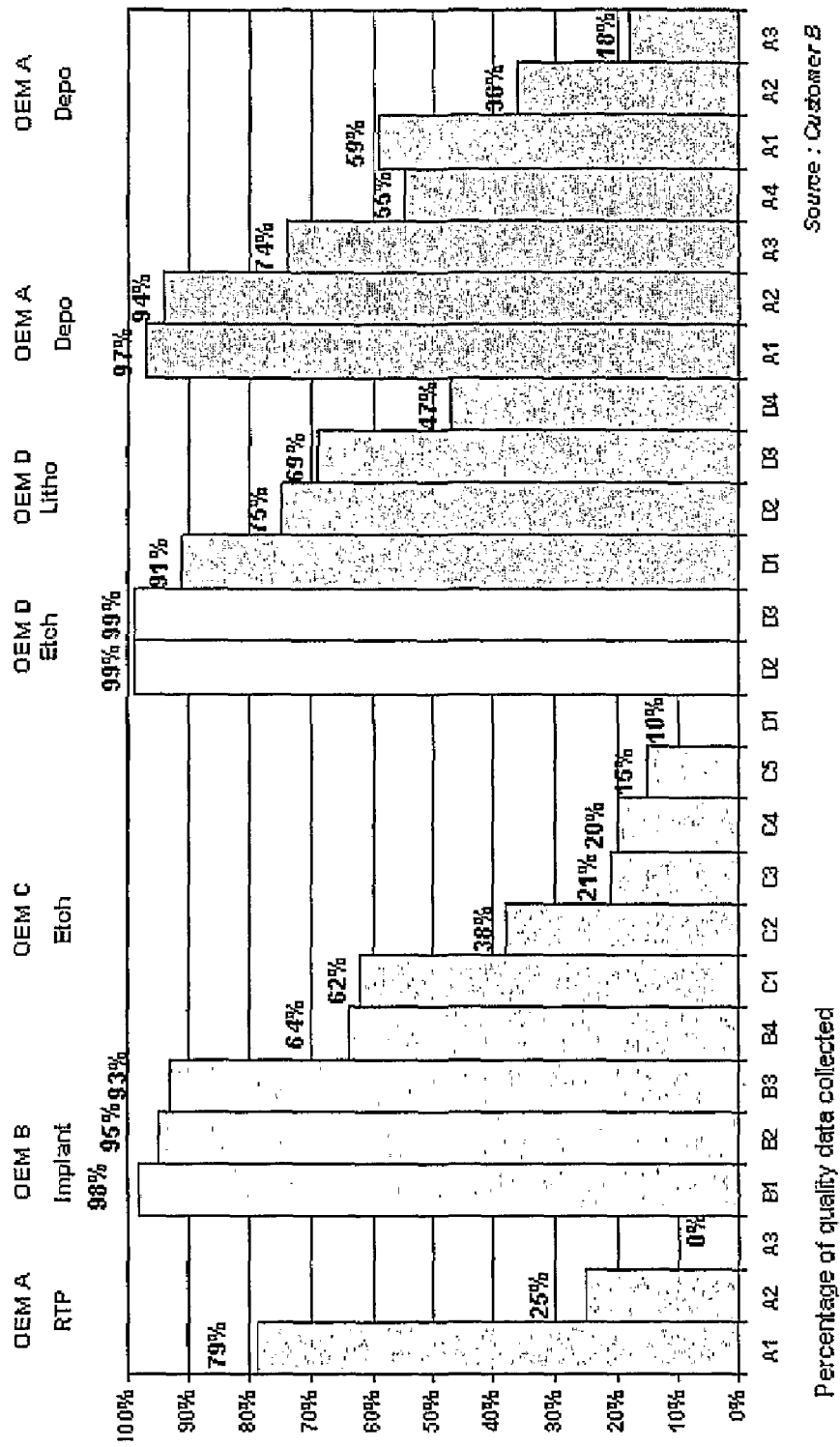
FIG. 9 is a comparative graph between different equipments tested according to one embodiment of the invention.

In this regard, FIG. 9 shows data reported by a semiconductor manufacturer after having checked several types of equipments ("RTP", "Implant", "Etch", "Litho", "Depo"), forming a DCQV characterization for each piece of equipment. Each bar represents the data collection capability of a piece of equipment. The height of a bar shows in percentage the average DCQV that has been found for this equipment. Such a comparative graph gives the Semiconductor manufacturer powerful measurement to test its equipment and to make improve the processing system, for enhancing data efficiency.

In addition, these DCQV data can be used as acceptance criteria to characterize the equipment data collection capability at qualification time, before connecting it to the FDC system.

FIG. 9 clearly shows which equipments are currently eligible or not to be placed under FDC system control.

The method for characterizing the Data Collection capability quality of semiconductor equipment is for example as follows:

a) Setup a Reference Machine, where the Data Collection system—including the DCQV calculation feature—is installed, b) Define the Reference Rules on how to setup Data Collection plans for this measurement context:
The data collection duration, normally during the whole process time,
The amount of different variable to be collected,
The sampling period,
(Several Data Collection plans can be defined by using different number of variables and different sampling time. In this case, either an average score can be defined to produce a global report, or individual reports can be made, one for each Data Collection plan. This last case can be used to highlight the Equipment individual limits in term of quantity of collectable variable, and in term of admissible sampling period.)

c) Qualify the Reference Machine by connecting an "injector" instead of the Real Equipment. The injector is a software tool simulating the Data Collection communication exchange with an optimized response time: Run the data collection and get the DCQV result. This result must be close to 1 (i.e. 0.99) in order to be able to measure the real equipment impact on the DCQV.

d) For each connected Equipment to be measured, setup the appropriate data collection plans according to the above rules, e) After the next Equipment run, get the DCQV value from the Data Collection system, and restart to step 4 if there is different data collection plan to apply, f) Finally, Compute & Report the results. Then restart to step d) for the next Equipment to qualify, if any.

It is understood that the present invention is not limited to the above detailed description of a preferred embodiment, but the skilled person will be able to devise many variants and changes.

The invention claimed is:

1. A method for evaluating quality of data collected in a manufacturing environment by a data collection system, the method comprising:
   (A) collecting raw data from a plurality of manufacturing equipment in the manufacturing environment according to a predefined Data Collection plan (DCPlan) specifying which data are to be collected, and for each data item in the collected raw data, a sampling time reference indicating at which time interval it is expected, and associating to each data item in the collected raw data a timestamp indicating the time at which it is actually collected,
   (B) for at least a portion of the collected raw data included inside a time window, determining a Data Collection Quality Value (DCQV) by:
      (a) reading timestamps of data items in the portion of the collected raw data;
      (b) computing at least one quality indicator value from a relationship between a timestamp and a corresponding time reference for each data item in the portion of the collected raw data, wherein a shift between a timestamp and a time reference for a data item in the portion of the collected raw data is representative of a malfunction of a manufacturing equipment in the plurality of manufacturing equipment or of the data collection system;
      (c) after steps (a) and (b) have been performed for all data items in the portion of the collected raw data, computing a single data collection quality value (DCQV) indicator for said time window.

2. A method according to claim 1, wherein a plurality of quality indicator values are computed and normalized, and said single DCQV indicator is set to the minimum of said quality indicator values.

3. A method according to claim 2, wherein said quality indicator values include a ratio between a number of actually collected data samples and a number of expected data samples in a given time window.

4. A method according to claim 2, wherein said quality indicator values include a time difference between a sampling period separating two successive requests for data samples and the actual interval separating the times at which these samples are effectively collected.

5. A method according to claim 4, wherein said quality indicator values include a sum of said time difference over a given time window.

6. A method according to claim 2, wherein said quality indicator values include an error indicator.

7. A method according to claim 6, wherein said error indicator can only take negative values while other indicator values are positive or null, where by the existence of an error can be detected from the single DCQV value.

8. A method for controlling a process in a manufacturing environment such as a semiconductor fab, wherein raw data from equipment, metrology, etc. are collected and analyzed, comprising:
   evaluating data collection quality according to claim 1 for a plurality of windows of data collection,
   performing data analysis for the data of a given window only if the quality of collected data is higher than a predetermined level.

9. A method for classifying pieces of equipment in a manufacturing environment such as a semiconductor fab, wherein raw data from pieces equipment, metrology, etc. are collected and analyzed, comprising:
   B evaluating data collection quality according to claim 1 for a plurality of windows of data collection and for a plurality of pieces of equipment,
   identifying a piece of equipment as acceptable in the environment only if the quality of collected data for this piece of equipment is higher than a predetermined level.

* * * * *